US005825465A

United States Patent [19]
Nerin et al.

[11] Patent Number: 5,825,465
[45] Date of Patent: Oct. 20, 1998

[54] AUTODYNE DETECTION LASER VELOCIMETER

[75] Inventors: Philippe Nerin, Seyssinet-Pariset; Pascal Besesty, Vaulnaseys Lehaut; Hervé Giraud, St Egreve; André Mouttet, Seyssinet Pariset, all of France

[73] Assignee: Commissariat A L'Energie Atomique, Paris, France

[21] Appl. No.: 896,034

[22] Filed: Jul. 17, 1997

[30] Foreign Application Priority Data

Jul. 23, 1996 [FR] France ................................ 96 09227

[51] Int. Cl.$^6$ ........................................................ G01P 3/36
[52] U.S. Cl. ............................................ 356/28.5; 356/5.09
[58] Field of Search .................................. 356/28.5, 5.09

[56] References Cited

U.S. PATENT DOCUMENTS

| | | | |
|---|---|---|---|
| 3,409,370 | 11/1968 | King et al. . | |
| 4,927,263 | 5/1990 | de Groot et al. | 356/5 |
| 4,928,152 | 5/1990 | Gerardin . | |
| 5,069,545 | 12/1991 | Hinz . | |
| 5,473,626 | 12/1995 | Fan et al. . | |
| 5,500,729 | 3/1996 | Redman et al. . | |
| 5,594,543 | 1/1997 | de Groot et al. | 356/5.09 |
| 5,748,295 | 5/1998 | Farmer | 356/5.09 |

FOREIGN PATENT DOCUMENTS

| | | |
|---|---|---|
| 235034 | 9/1987 | European Pat. Off. . |
| 448751 | 10/1991 | European Pat. Off. . |
| 392172 | 10/1992 | European Pat. Off. . |
| 2108348 | 5/1983 | United Kingdom . |
| 2183956 | 6/1987 | United Kingdom . |

OTHER PUBLICATIONS

Applied Optics, vol. 33, No. 6, 20 Feb. 1994, pp. 1111–1114, XP000434817, Otsuka K., "Ultrahigh Sensitivity Laser Doppler Velocimetry with a Microchip Solid–State Laser".

Review of Scientific Instruments, vol. 66, No. 5, May 1995, pp. 3116–3120, XP000195836, Okamoto et al., "Ultranhigh Sensitive Laser–Doppler Velocity Meter with a Diode–Pumped ND: YV05 Microchip Laser".

Applied Optics, vol. 27, No. 21, 1 Nov. 1988, pp. 4475–4480, XP000068781, Groot De P J et al., "Ranging and Velocimetry Signal Generation in a Backscatter–Modulated Laser Diode".

"Laser–Amplifier Gain and Noise", R. Loudon and M. Harris et al., Physical Review A, vol. 48, No. 1, pp. 681–700, Jul. 1993.

P.J. de Groot et al., "Backscatter Modulation Semiconductor Laser Radar", SPIE, vol. 1103, Laser Radar IV (1989).

K. Otsuka, "Nonlinear Phenomenia in Semiconductor Lasers", SPIE, vol. 1497, pp. 432–443.

K. Otsuka, "Ultrahigh Sensitivity Laser Doppler Velocimetry with a Microchip Solid–State Laser", Applied Optics, 20 Feb. 1994, vol. 33, No. 6.

Okamoto et al., "Ultrahighly Sensitive Laser–Doppler Velocity Meter with a Diode–Pumped Nd:YVO$_4$ Microchip Laser", Rev. Sci. Instrum. 66(5), May 1995, pp. 3116–3120.

*Primary Examiner*—Mark Hellner
*Attorney, Agent, or Firm*—Pearne, Gordon, McCoy & Granger LLP

[57] ABSTRACT

Autodyne laser velocimeter comprising:
  a microlaser (10) capable of emitting respectively a first (40) and second (42) beam,
  pumping means (12) capable of supplying a pumping beam light to the microlaser,
  optical means (14) capable of directing the first beam (40) at a target (50) and of sending the light re-emitted by the target (50) to the microlaser (10),
  photoelectric detection means (16) of receiving the second beam and emitting a detection signal corresponding to a modulation in the intensity of the second beam, and
  means (17) of processing the detection signal to determine a characteristic magnitude of a displacement velocity of the target.

Application to metrology.

17 Claims, 3 Drawing Sheets

AUTODYNE DETECTION LASER VELOCIMETER

DESCRIPTION

1. Field of the Invention

The present invention relates to an autodyne detection laser velocimeter. A velocimeter is understood to be an apparatus for taking precise measurements of velocities, vibrations or displacements.

Moreover, detection is considered autodyne when the laser is used as both emitter and receiver of light.

The invention has applications in a wide variety of fields such as medical instruments, metrology, pollution detection, the automobile industry or microscopy. More generally, the invention has applications to all remote measuring without physical contact of displacement vibrations or the velocity of any target.

2. Discussion of the Prior Art

In order to use a laser beam to measure the displacement velocity of a target, a beam of coherent light, called the emission beam, is normally sent to the target from a laser source and a beam that is reflected or diffused by the target, called the measuring beam, is collected. An optical system is used to cause interference of the measuring beam and the emission beam on a photoelectric detector. Next, a magnitude characteristic of the displacement velocity, such as the Doppler frequency related to the movement of the target, is determined by a photoelectric signal processing system.

The use of this type of velocimeter, known as a coherent detection velocimeter, presents a certain number of difficulties.

The first difficulty is related to the alignment and parallelism of the emission and measuring beams that are to interfere. A large number of lasers emit a beam whose wavelength is in the region of 1 µm. At such wavelengths even the slightest error of alignment or parallelism compromises interference of the beams and makes measuring velocity impossible.

Another difficulty with coherent detection velocimeters relates to loss of coherence of the beam once it has encountered the target whose displacement is to be measured. A measurement based on the interference of the emission and measuring beams requires good coherence of these signals. The encounter between the emission beam and a highly-disordered medium, or the interaction of the emission beam with the target causes loss of measuring beam coherence.

This difficulty necessitates the use of complex optical systems to re-establish the coherence of the measuring beam or to filter the beam.

A third difficulty with laser velocimetry systems concerns constraints related to the ocular safety of the user. The emission beam must be weak enough not to damage the user's eyes. The energy of the measuring beam or the optical signals coming from the target are thus particularly weak.

These constraints normally give rise to a very low signal-to-noise ratio. To overcome these limitations sophisticated optical apparatuses and a very low-noise electronic system must be used thereby making laser velocimeters costly.

Finally, it is a fact that at the present time very few apparatuses using the coherent detection principle operate using beams with a wavelength of the order of a micron even though such laser sources are easily available on the market.

One way of overcoming the problems raised above consists in using the laser as both the light emitter and receiver.

In this system, the principle of the inverse return of light ensures that the emission and measuring beams are aligned.

This type of detection is known as autodyne or "Self-Mixing" detection. This subject is dealt with in document (1), references of which are given at the end of the present description.

An autodyne detection apparatus comprising a gas laser is also described in document (2), references of which are also given at the end of the present description.

The principle of autodyne detection uses various physical properties of the amplifying medium to produce efficient detection means. The physical process can be summarized as follows: when a minute part of the light emitted by the laser returns to the laser after reflection or diffusion on a moving target, a modulation of the intensity of the laser is observed. This intensity modulation is due to non-linear effects present in the amplifying medium such as, for example, saturation effects. The intensity modulation comprises the characteristic Doppler frequency of the displaced target. Suitable processing of the signal emitter by a detector measuring the intensity modulation can thus be used to obtain the velocity or displacement of the target intercepting the laser beam.

Documents (3) and (4), references of which are given at the end of the present description, show types of apparatus using the principle of homodyne detection with amplification of light.

These apparatuses comprise a laser diode that is a more compact source than a gas laser. The facing surfaces of the cavity of a laser diode consist of two mirrors with a high transmission coefficient (of the order of 70%). These mirrors are obtained by splitting a semiconductor block. It should also be noted that the coefficients of transmission of the two facing surfaces of a laser diode are more or less identical.

In an optical assembly in which a laser diode is disposed between photoelectric detection means and a target to be measured, the direct light arriving from the target passes through the laser diode and reaches the photoelectric detection means. This is possible due to the high transmission coefficient of the facing surfaces of the laser diode. The signal arriving from the target is amplified as it passes through the laser cavity, giving a good signal to noise ratio. This type of detection is known as homodyne detection.

Although the use of a laser diode is a major advantage for industrial applications, when a target returns too much light to the cavity of the laser diode significant instabilities of intensity make measurement of intensity modulation impossible.

These instabilities are particularly due to too high a coupling of the laser diode cavity with the target. This is due to the high transmission coefficient (of the order of 70%) of the exit mirror of laser diodes.

Another cause of instability is the high gain in the cavity of laser diodes; this is of the order of 100 cm$^{-1}$ in laser diodes commonly available on the market.

A third cause of instability in laser diodes is the non-linear coupling of electrons and photons. This coupling is characterized by a coefficient $\alpha$ which may be understood as a measurement of non-linearity of the laser. Coefficient $\alpha$, which is proportional to the partial drift in the index n of the active medium in relation to the number N of inversions of population in the laser, is of the order of 3 to 7 for laser diodes commonly available on the market.

Phenomena of non-linearity and instability of laser diodes are described in more detail in document (5), references of which are given at the end of the present description.

Instability problems make it necessary to use lasers incorporating mirrors with a high level of reflectivity, an amplifier material with a relatively low gain, and a coefficient α that is as low as possible. Otsuka and Okamoto et al. have taken accurate velocity measurements using microchip lasers (microlasers); see documents (6) and (7), references of which are given at the end of the present description. The use of this type of laser solves the instability problems inherent in the use of laser diodes. The exit mirror of a microlaser has a low transmission coefficient, of the order of 1 to 5%, the gain in the laser cavity is low, of the order of 0.1 cm$^{-1}$, and the α coefficient is virtually nil.

The main drawback of microlaser apparatuses arises from the fact that intensity modulation is only significant when the Doppler frequency is close to the relaxation frequency $F_R$ of the laser.

The relaxation frequency $F_R$ of the laser is defined by the following relation:

$$F_R = \frac{1}{2\pi} \sqrt{\frac{r-1}{\tau_p \tau_f}}$$

where $\tau_p$ is the lifespan of photons in the laser cavity, $\tau_p$ the lifespan of laser transition and r a pumping parameter of the laser cavity. To measure a velocity the relaxation frequency must be continuously adjusted in relation to the velocity of the target. In document (7) Okamoto et al. suggests adjusting the pumping coefficient r to adjust the relaxation frequency of the laser to the Doppler frequency of the movement of the target. These provisions make the electronic circuits associated with the velocimeter extremely complex and do not simplify measurement.

The present invention consequently aims to produce a laser velocimeter that does not have the limitations and constraints described above.

A particular aim of the invention is to produce a laser velocimeter free from instability.

Another aim is to produce a laser velocimeter capable of directly measuring the velocity of a target over a wide range of velocities without adjusting the pumping parameter.

A further aim is to produce a laser velocimeter that presents no problems of alignment of the emission and measuring beams.

Another aim is to produce a laser velocimeter that is almost unaffected by any incoherence of the measuring beam.

Another aim of the invention is to produce a laser velocimeter free of crosstalk problems.

A final aim of the invention is to produce a simple, low-cost laser velocimeter.

DISCLOSURE OF THE INVENTION

To achieve the above aims the present invention relates more precisely to an autodyne detection laser velocimeter comprising:

a microlaser comprising a gain medium with facing first and second emission surfaces capable of emitting respectively a first and second beam from the first and second surfaces respectively, the second emission surface having a lower transmission coefficient than that of the first surface, pumping means capable of supplying a pumping beam to the microlaser, optical means capable of sending the first beam to a target and of directing the light re-emitted by the target to the microlaser, photoelectric detection means for receiving the second beam and emitting a detection signal, and means for processing the detection signal to establish a magnitude characteristic of a displacement velocity of the target.

According to a particular aspect of the invention, processing means may be provided to determine a Doppler frequency characteristic of the displacement of the target and to calculate a magnitude chosen from among a vibration frequency of the target, a displacement of the target and a velocity of the target.

For the purposes of the present invention a microlaser is understood to be a continuous emission laser having a solid amplifying active medium, usually in the form of a crystal. This type of laser is pumped by an external light source.

The microlaser used in the velocimeter is different from a laser diode that has a semiconductor active medium and is electrically pumped.

The microlaser emits a first beam of light onto the target and receives the re-emitted light, i.e. the light reflected or diffused by the target. The principle of the inverse return of light ensures that this light passes through the same optical means used to direct the first emission beam onto the target.

There is therefore no disalignment between the light emitted by the first beam and the measuring beam received from the target. It is therefore possible to take measurements using a low wavelength beam.

The two facing surfaces of the microlaser constitute mirrors whose light transmission coefficients are very different. The first surface, facing the target, has a transmission coefficient at the laser wavelength of the order of 50% to 95% (0.5 to 0.95). In contrast, the transmission coefficient of the second surface, turned towards the detection means, has a transmission coefficient of less than 5%, and preferably less than 1%.

The very low transmission coefficient of the second surface and the difference between the transmission coefficients of the facing first and second surfaces makes it possible to optically isolate the means of photoelectric detection from the light received from the target. The light received from the target and injected into the microlaser modifies the properties of the microlaser cavity and acts on the stationary oscillation present in the cavity.

The gain medium of the microlaser therefore demodulates and amplifies the optical signals.

The second beam directed towards the means of photoelectric detection can be compared with a leak beam that reflects the state of oscillation of the microlaser cavity.

The velocimeter according to the invention thus operates using a type of detection known as autodyne.

The principle of autodyne detection only requires a very small amount of light, therefore allowing a velocimeter to operate using low-intensity beams that are compatible with user eye-safety.

The microlaser also acts as a spatial filter of light coming from the target; the laser mode constitutes a spatial filter that rejects the non-coherent light coming from the target. The spatial filtering provided by the microlaser is particularly related to the form of pumping beam emitted by the pumping means. The microlaser therefore obviates coherence problems between the light of the emission beam and the light returned by the target.

The intensity modulation of the microlaser caused by the light coming from the target is measured according to the invention not in the optical system of the measuring beam, i.e. the first beam, by using a second beam emitted by the laser.

The first and second beams are emitted by facing emitting surfaces of the microlaser. As noted above, this characteristic makes it possible to optically isolate the optical system of the first beam and the optical system of the second beam used for detection. This characteristic is particularly advantageous since it overcomes a phenomenon known as crosstalk, i.e. mixing of the light directed at the target and the light reflected on the forward surface of the detector. This property is ensured by selecting a microlaser with a highly-reflective mirror on the detector side.

According to a particular aspect of the invention that may be considered an improvement of the system described above, the velocimeter may be fitted with a microlaser capable of emitting light beams comprising respectively two waves electromagnetically polarized linearly and orthogonally. In this configuration the velocimeter also comprises an analyzer disposed on one optical path of the second beam targeted at the detection means.

This particularly advantageous characteristic allows detection of a Doppler frequency in a very wide spectrum of frequencies ranging from zero to several hundred kilohertz without the need for any adjustment to the laser pumping, i.e. without adjusting the relaxation frequency.

For example, an Nd:YAG type microlaser can be used for very sensitive detection over a range of 0 to 100 kHz.

Displacements of a target in a wide range of speeds may thus be detected and measured. In particular, it is possible to measure the Doppler frequency in the range of audible frequencies.

The analyzer placed in the optical path of the second beam acts essentially to eliminate either the orthogonal or linear electromagnetic wave of the second beam before it reaches the detection means.

This avoids the two waves in opposing phase canceling one another out in conventional detection means that are not sensitive to the phase or polarization of the waves detected.

In order to emit a beam comprising two linearly and orthogonally polarized waves the microlaser may comprise an amplifying material that is intrinsically double refracting or birefringent.

This may, for example, consist of an intrinsically birefringent crystal split along a plane C (C-cut). The crystal may, for example, be any of the following: $YLiF_4$, $LaMgAl_{11}O_9$ or $YVO_4$ doped with neodymium (written $YVO_4$:Nd).

The amplifying material may also be an isotropic crystal, of the YAG:Nd type, for example, that has been subjected to stress during growth making it birefringent.

Another method causing birefringence is to permanently subject the amplifying material to permanent perpendicular stress at the axis of the first and second beams.

Other characteristics and advantages of the present invention will be better understood from the following description. The description is non-limitative and refers to the attached figures.

DETAILED DESCRIPTION OF EMBODIMENTS OF THE INVENTION

Figure 1:
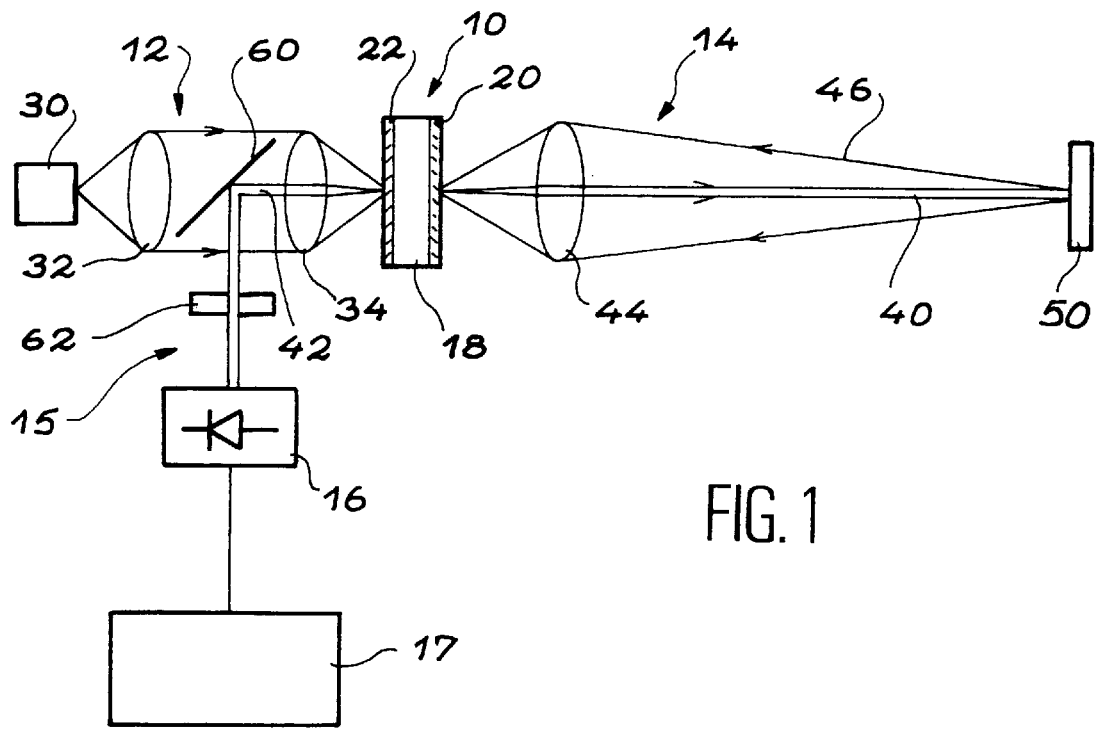
FIG. 1 is a diagram of a first embodiment of a laser velocimeter according to the invention.

FIG. 1 shows a first embodiment of the velocimeter. The velocimeter comprises a continuous microlaser 10, for example of the YAG:Nd type, that has an emitting power of the order of 1 mW. It also comprises means 12 for pumping microlaser 10, an optical measuring system 14 and an optical detection system 15.

Microlaser 10 comprises an amplifying active gain medium 18 and two mirrors 20 and 22 disposed on either side of the active material. The active material of the microlaser is chosen to be birefringent and able to emit two electromagnetic waves polarized linearly and orthogonally, noted as S and P. The material should preferably be chosen so that neither polarization of waves S and P is stronger than the other but so that they have amplitudes of the same order of magnitude; this is the case with YAG:Nd. This condition is not, however, essential.

Electromagnetic waves S and P are characterized by their very close optical frequencies noted as $v_s$ and $v_p$; this is advantageous to give significant coupling of the two modes, e.g. $v_s-v_p \approx 50$ MHz.

Mirrors 20 and 22 respectively constitute the first and second emission surfaces of the laser and also constitute an optical resonator. These mirrors are particularly characterized by their reflectivity at wavelengths $\lambda_s=c/v_s$, $\lambda_p=c/v_p$ where c is the velocity of light at pumping wavelength $\lambda_L$.

For example, a reflectivity of $R_{20}$ may be chosen for mirror 20 such that $R_{20}(\lambda_s)=R_{20}(\lambda_p)=0.95$.

For mirror 22 a reflectivity $R_{22}$ may be chosen such that $R_{22}(\lambda_s)=R_{22}(\lambda_p)>0.99$ and $R_{22}(\lambda_L)>0.01$.

In the example shown, the pumping means 12 of the laser comprise a pumping diode 30, such as, for example, a laser diode with a wavelength 0.08 μm. The pumping means also have an optical system to focus the pumping beam onto the microlaser. The optical system comprises two lenses numbered 32 and 34.

When the optical pumping provided by pumping means 12 exceeds a given threshold, the microlaser emits two laser beams. The pumping threshold for emission of the beams is not only dependent on the amplifier material 18 but also on mirrors 20 and 22.

The microlaser beams are emitted by the first and second surfaces of the laser respectively and are referred to as the first and second beams. The colinear first and second beams are numbered 40 and 42 respectively and are emitted in opposite directions.

The first beam 40 is directed at the target 50 whose vibration spectrum or displacement velocity, for example, is to be determined using the optical measuring system 14. The target 50 may be cooperative, i.e. a material that reflects the light, or non-cooperative, i.e. a material that diffuses the light.

In the example shown in FIG. 1 the optical system 14 comprises a lens 44 with a focal length F disposed at a distance from microlaser 10 that is more or less equal to focal length F. The lens 44 collimates the first laser beam 40 emitted by the microlaser 10. It also focuses the light reflected or diffused by the target into the microlaser which also constitutes a light receiver. The light rays numbered 46 in the figure represent the light re-emitted by the target 50.

The second beam 42 emitted by the second surface of microlaser 10 is directed at photoelectric detection means 16 by the optical detection system 15.

The optical detection system, of which cavity 10 is also a part, being a receiver and amplifier of the light re-emitted by the target, also comprises a section 60. This section is disposed between the pumping beam source and the second surface of the laser, more exactly between lenses 32 and 34. Section 60 is more or less transparent at wavelength $\lambda_L$ (0.8 μm) of the pumping beam but reflects very similar wavelengths $\lambda_s$ and $\lambda_p$ (≈1.06 μm) of the two waves emitted by microlaser 10. This may, for example, be a dichroic section with maximum reflectivity at a wavelength of 1.06 μm and maximum transmission at 0.8 μm.

Section 60 is used to deflect the second beam 42 that is initially colinear with the first beam 40 towards the photoelectric detection means.

The optical detection system also comprises, in common with the pumping means, the lens 34 for collimating or focusing the second beam 42 onto detection means 16.

The optical detection system finally comprises an analyzer (polarizer) 62 disposed upstream of the photoelectric detector 16 to eliminate electromagnetic wave S or P of the second beam 42.

Photoelectric detection means 16 comprise, for example, a PIN photodiode capable of transforming the luminous signal received into an electric signal.

The electric signal is fed into signal processing means 17 described below.

It should be noted that in the apparatus of FIG. 1 the light 46 reflected or diffused by the target does not directly reach detection means 16. This light is received by the microlaser and essentially stopped by the mirror 22 forming the second surface of the laser. Detection means 16 are, therefore, to a great extent optically isolated from the light coming from the target. Similarly, the microlaser is only slightly subject to perturbation by the light diffused and reflected onto the detector.

Figure 2:
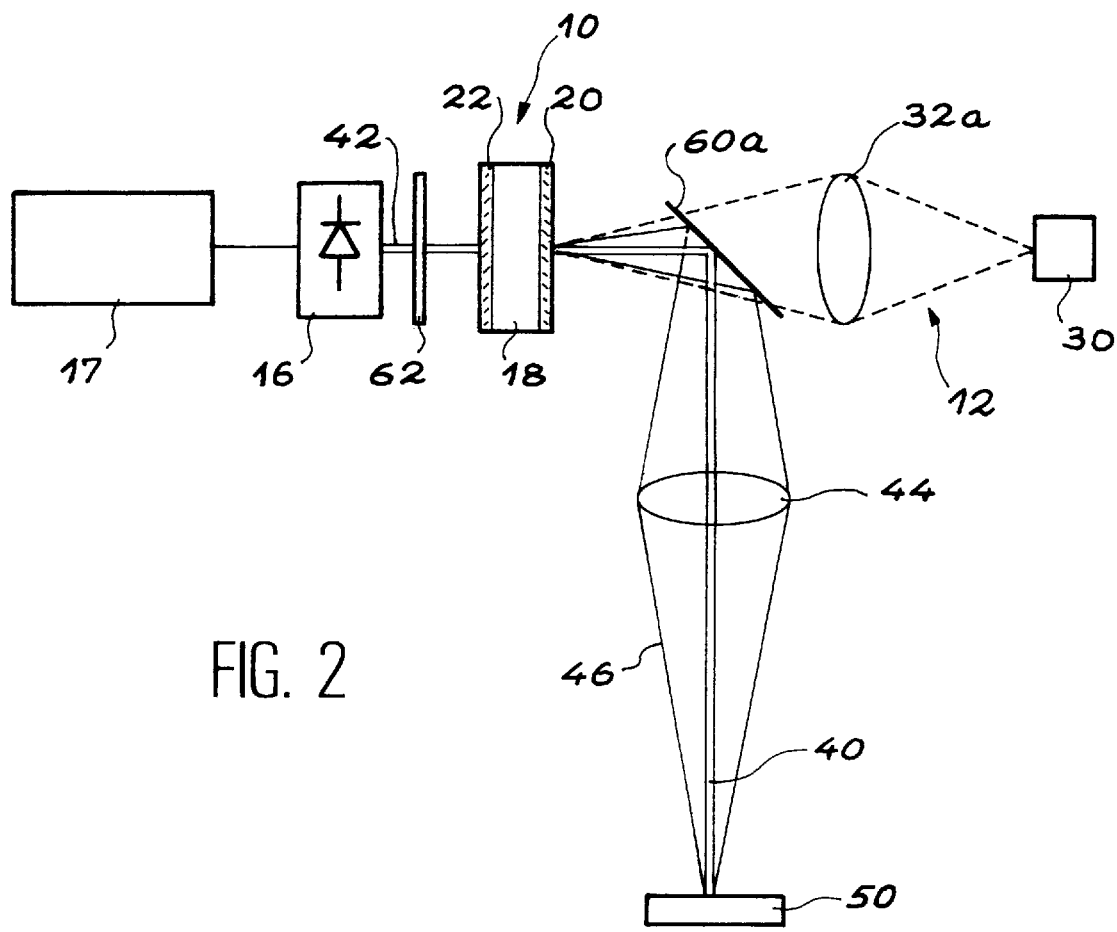
FIG. 2 is a diagram of a second embodiment of a laser velocimeter according to the invention.

FIG. 2 is a variant of an embodiment of the velocimeter according to the invention. Any components that are identical or similar to those in FIG. 1 have the same numbers. The foregoing description can therefore be referred to for explanation.

In the apparatus of FIG. 2 the pumping means 12, the laser 10 and detection means 16 are aligned on the same axis.

The pumping means comprise a lens 32a to focus the pumping beam onto laser 10.

Between the first surface of laser 10 and pumping beam source 30 is disposed a section 60a that is more or less transparent at wavelength $\lambda_L$ of the pumping beam and reflecting at wavelengths $\lambda_s$ and $\lambda_p$ of the first beam 40.

Section 60a is part of the optical measuring system and deflects the first beam 40 out of the axis of the laser towards target 50. The measuring system also comprises a lens 44 that, as in the apparatus of FIG. 1, focuses the light re-emitted by the target 50 onto microlaser 10.

In the apparatus of FIG. 2, the optical detection system only comprises, in addition to laser 10, an analyzer 62. The photoelectric means 16 directly intercept the second beam 42 of the laser once it has passed through the analyzer. As in the apparatus of FIG. 1 the detection means and the target are on opposite sides of the microlaser.

Figure 3:
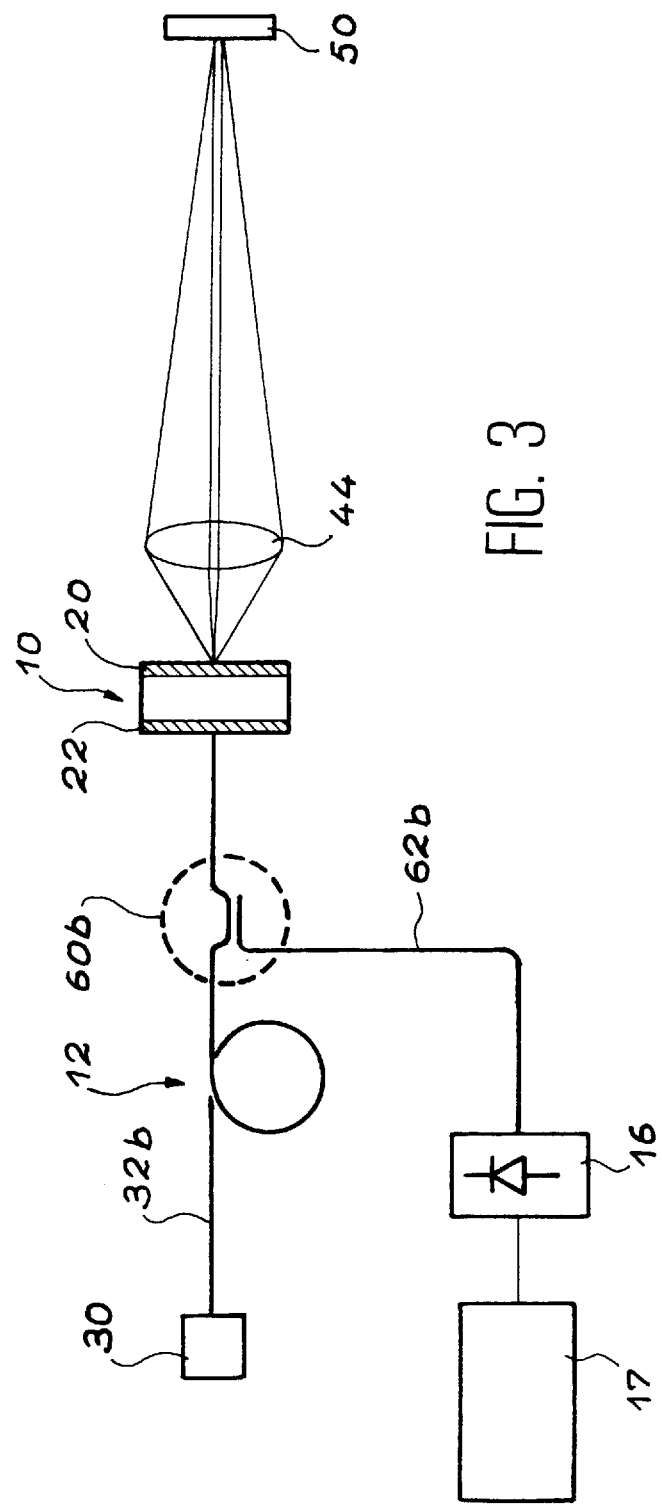
FIG. 3 is a diagram of a third embodiment of a laser velocimeter according to the invention.

FIG. 3 is a diagram of a third embodiment of a laser velocimeter according to the invention.

In this figure any components that are identical or similar to those in FIGS. 1 and 2 have the same numbers.

The pumping means 12 comprise a pumping laser diode 30 coupled to a pumping optical fiber 32b. The pumping beam emitted at a wavelength $\lambda_L$ is collected by the optical fiber 32b, passes through an optical coupler 60b and pumps microlaser 10. Microlaser 10 acts as both emitter and receiver.

The beam emitted by the surface formed by mirror 22 is collected by fiber 32b and enters coupler 60b. Part of the second beam emitted by the microlaser is conducted by measuring fiber 62b, via coupler 60b, to photoelectric means 16. The optical detection system 16 thus comprises the optical coupler 60b and the optical measuring fiber 62b. In the improved embodiment using two linearly and orthogonally polarized waves described above this optical fiber may be a fiber that maintains polarization. This is not, however, essential.

This embodiment is particularly advantageous since it is compatible with a microsystem approach of considerable use in the biomedical field. In this "all optical fiber" version, the assembly consisting of microlaser 10 and lens 44 constitutes a very small optical sensor that may be introduced into the human body. In this type of application the lens may be a microlens. The simplicity of construction and use of this last sensor version is particularly advantageous for various industrial applications. The sensor thereby produced may be introduced into locations where access is difficult.

The operation of the means of processing signal 17 will now be explained briefly with reference to FIGS. 4 and 5.

Figure 4:
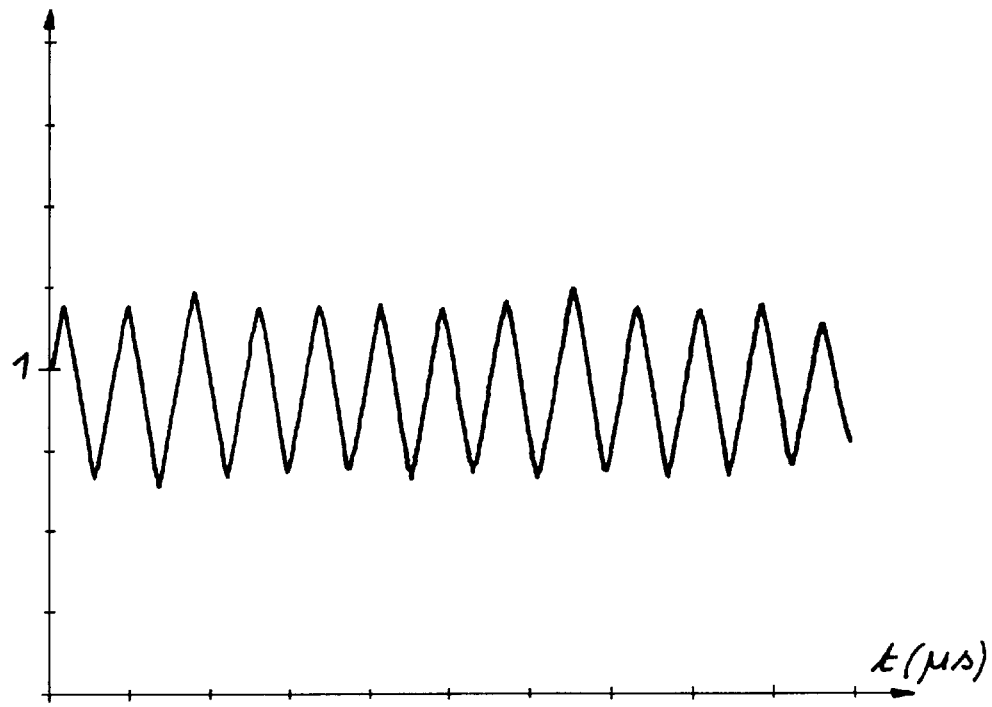
FIG. 4 shows the signal supplied by a photoelectric detector in response to the displacement of a target.

FIG. 4 shows the electric signal supplied by photoelectric detection means 16 in response to the displacement of a target at a given velocity. The amplitude of the electric signal is plotted at an arbitrary scale as the ordinate and time, measured in microseconds, is plotted as the abscissa of the graph in FIG. 4.

When the velocimeter is used as a displacement sensor, signal processing consists in counting the number of alternations of the signal. Each alternation represents two successive maximums or two successive minimums and corresponds to a displacement of the target of $\lambda/2$ where $\lambda$ is the wavelength of the laser ($\lambda \approx \lambda_s \approx \lambda_p$). For example, if K alternations are counted the displacement d of the target is:

$$d = K \cdot \lambda / 2.$$

These alternations may be counted using an electronic counter. FIG. 4 shows the alternations of the signal.

Figure 5:
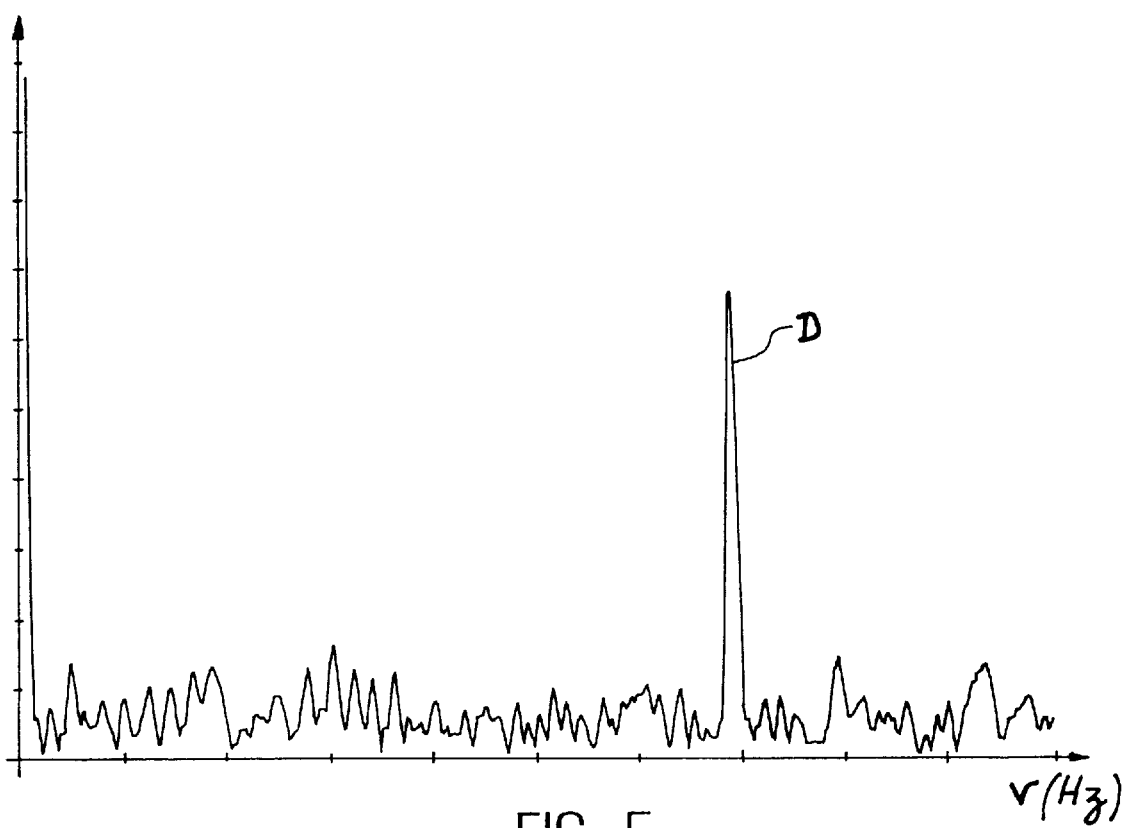
FIG. 5 shows the Fourier transform of the signal in FIG. 3 supplied by a frequency analyzer connected to the detector.

When the velocimeter is used as a velocity sensor or for vibration measurement the electric signal is processed by a fast Fourier transform (FFT) that constitutes part of the processing means 17 to give the signal shows in FIG. 5. This signal has a peak D that is the Doppler frequency associated with the displacement velocity of the target. The amplitude of the Fourier transform plotted as ordinate and the frequency plotted as abscissa are shown at an arbitrary scale.

Processing means 17 may comprise a computer able to calculate the velocity V of the target from the Doppler frequency. The velocity V may be calculated using the formula:

$$V = \frac{v_D \lambda}{2}$$

where $v_D$ is the Doppler frequency and $\lambda$ the wavelength of the laser ($\lambda \approx \lambda_s \approx \lambda_p$).

In a special embodiment, the signal processing means may comprise a radiofrequency analyzer.

REFERENCES

1 Laser-amplifier gain and noise, R. Loudon and M.Harris et al., Physical Review A, Vol. 48 No. 1, pp. 681–700, July 1993.

2 U.S. Pat. No. 3,409,370

3 U.S. Pat. No. 4,928,152

4 P. J. de Groot et al., Backscatter Modulation Semiconductor Laser Radar, SPIE, Vol. 1103, Laser Radar IV (1989).

5 K. Otsuka, Nonlinear Phenomena in Semiconductor Lasers, SPIE, Vol. 1497, pp. 432–443.

6 K. Otsuka, Ultrahigh Sensitivity Laser Doppler Velocimetry with a Microchip Solid-state Laser, Applied Optics, 20 Feb. 1994, Vol. 33 No. 6.

7 Okamoto et al., Ultrahighly Sensitive Laser-Doppler Velocity Meter with a Diode-pumped Nd:YVO$_4$ Microchip Laser, Rev. Sci. Instrum. 66(5), May 1995, pp. 3116–3120.

We claim:

1. Autodyne detection laser velocimeter comprising:

a microlaser (10) comprising facing first (20) and second (22) emission surfaces capable of emitting respectively a first (40) and second (42) beam from the first and second surfaces (20, 22) respectively, the second emission surface having a lower transmission coefficient than that of the first surface, pumping means (12) capable of supplying a pumping beam to the microlaser, optical means (14) capable of sending the first beam (40) to a target (50) and of directing the light re-emitted by the target (50) to the microlaser (10), photoelectric detection means (16) for receiving the second beam (42) and emitting a detection signal, and means (17) for processing the detection signal to establish a magnitude characteristic of a displacement velocity of the target.

2. Velocimeter of claim 1 wherein the processing means are capable of determining the Doppler frequency characteristic of the displacement of the target and of calculating a magnitude chosen from among a vibration frequency of the target, a displacement of the target and a velocity of the target.

3. Velocimeter of claim 1 fitted with a microlaser (10) capable of emitting light beams comprising respectively two waves electromagnetically polarized linearly and orthogonally and also comprising an analyzer (62) disposed on one optical path of the second beam (42) targeted at the detection means.

4. Laser velocimeter of claim 3 wherein the microlaser (10) comprises an amplifying material (18) that is intrinsically birefringent for emitting said two electromagnetic waves.

5. Laser velocimeter of claim 3 wherein the amplifying material (18) is an intrinsically birefringent crystal split along a plane C (C-cut).

6. Laser velocimeter of claim 5 wherein the crystal is chosen from among the following: YVO$_4$, YLiF$_4$ and LaMgAl$_{11}$O$_9$.

7. Laser velocimeter of claim 4 wherein the amplifying material (18) is a crystal that has been subjected to stress during growth.

8. Laser velocimeter of claim 3 wherein the microlaser comprises an amplifying material (18) subject to stress perpendicular to the first and second beams.

9. Laser velocimeter of claim 1 wherein the pumping means (12) comprise a pumping beam source (30) and an optical system (32, 32b, 34) that focuses the pumping beam onto the microlaser.

10. Laser velocimeter of claim 9 wherein the optical system of the pumping means comprises a pumping optical fiber (32b).

11. Velocimeter of claim 10 comprising an optical measuring fiber 62b connected to photoelectric detection means and coupled to pumping optical fiber (32b) by an optical coupler (60b).

12. Laser velocimeter of claim 1 wherein microlaser (10) comprises an active medium consisting of an amplifying material (18) and two mirrors (20, 22) that respectively constitute the first and second emission surfaces and also constitute an optical resonator.

13. Laser velocimeter of claim 1 wherein optical means (14) comprise a lens (44) with a focal length (F), said lens being disposed in front of first surface (20) at a distance from said surface that is more or less equal to focal length (F).

14. Laser velocimeter of claim 1 wherein photoelectric detection means (16) comprise a PIN-type photodiode.

15. Laser velocimeter of claim 1 wherein the means of processing the detection signal (17) comprise a radiofrequency analyzer.

16. Velocimeter of claim 1 comprising a section (60) that is more or less transparent at the wavelength of the pumping means (12) but reflects the second beam (42) emitted by microlaser (10), said section being disposed between the pumping beam source (30) and the second surface (22) of microlaser (10) to deflect the second beam (42) onto detection means (16).

17. Velocimeter of claim 1 comprising a section (60a) that is more or less transparent at the wavelength of the pumping means (12) but reflects the first beam (40) emitted by microlaser (10), said section being disposed between the pumping beam source and the first surface of the microlaser to deflect the first beam onto the target.

* * * * *

UNITED STATES PATENT AND TRADEMARK OFFICE
CERTIFICATE OF CORRECTION

PATENT NO. : 5,825,465
DATED : October 20, 1998
INVENTOR(S) : Nerin et al.

It is certified that error appears in the above-identified patent and that said Letters Patent is hereby corrected as shown below:

On the Title Page, OTHER PUBLICATIONS, Line 5, delete "Ultranhigh" and insert --Ultrahighly--.

On the Title Page, OTHER PUBLICATIONS, Line 7, delete "YVO4" and insert --YVO$_4$--.

On the Title Page, OTHER PUBLICATIONS, Line 17, delete "Phenonmenia" and insert --Phenomena--.

Column 8, Line 59, delete "vDis" and insert --v is--.

Signed and Sealed this

Thirtieth Day of March, 1999

Attest:

Q. TODD DICKINSON

*Attesting Officer*　　*Acting Commissioner of Patents and Trademarks*